(12) United States Patent
Bellanger

(10) Patent No.: US 8,520,758 B2
(45) Date of Patent: Aug. 27, 2013

(54) MULTICARRIER DIGITAL SIGNAL TRANSMISSION SYSTEM USING FILTER BANKS AND MEMORY PRELOADING FOR INITIALIZATION

(75) Inventor: Maurice Bellanger, Paris (FR)

(73) Assignee: Conservatoire National des Arts et Metiers (CNAM), Paris (FR)

( * ) Notice: Subject to any disclaimer, the term of this patent is extended or adjusted under 35 U.S.C. 154(b) by 202 days.

(21) Appl. No.: 13/059,129

(22) PCT Filed: Sep. 9, 2009

(86) PCT No.: PCT/FR2009/001076
§ 371 (c)(1),
(2), (4) Date: Feb. 15, 2011

(87) PCT Pub. No.: WO2010/029225
PCT Pub. Date: Mar. 18, 2010

(65) Prior Publication Data
US 2011/0142152 A1    Jun. 16, 2011

(30) Foreign Application Priority Data

Sep. 10, 2008 (FR) ...................................... 08 04975

(51) Int. Cl.
*H04L 5/12*    (2006.01)
(52) U.S. Cl.
USPC ........... 375/261; 375/260; 370/204; 370/208; 711/5

(58) Field of Classification Search
None
See application file for complete search history.

(56) References Cited

U.S. PATENT DOCUMENTS

2004/0125740 A1 *   7/2004   Gardner ........................ 370/208

OTHER PUBLICATIONS

Ihalainen T. et al.: "On Spectrally efficient multiplexing in cognitive radio systems", Wireless Pervasive computing, 2008. ISWPC 2008. 3rd International Symposium on IEE, Piscataway, NJ, USA, May 7, 2008, pp. 675-679, ISBN; 978-1-4224-1652-3, Chapitre III.
International Search Report, dated Jan. 21, 2010, from corresponding PCT application.

* cited by examiner

*Primary Examiner* — Adolf Dsouza
(74) *Attorney, Agent, or Firm* — Young & Thompson

(57) ABSTRACT

A transmission system includes an emitter (100) that includes an iFFT block (101) coupled to a set of memories (102-105) feeding a weighted summation device (106). Switches (113, 114, 115) are introduced at the intput of the memories, in order to load the set of samples provided by the iFFT block when the first symbol is fed to the input of the emitter. This system may also include a receiver (200) that includes a set of memories (202-205) feeding a weighted summation device (206) coupled to a FFT block (201). Switches (213, 214, 215) are introduced at the input of the memories in order to load the set of samples received, corresponding to the first transmitted symbol. A method of transmission with preloading of the memories that is extended to OQAM modulation and MIMO systems is also described.

7 Claims, 3 Drawing Sheets

MULTICARRIER DIGITAL SIGNAL TRANSMISSION SYSTEM USING FILTER BANKS AND MEMORY PRELOADING FOR INITIALIZATION

BACKGROUND OF THE INVENTION

The invention relates to a system for the transmission of digital data over a communication channel using a filter bank based multicarrier modulation and, more particularly, to an improved initialization method for use in such a system.

TECHNOLOGICAL BACKGROUND

Transmission systems resort to multicarrier modulation to reach high efficiency and provide operational flexibility. Two approaches have been considered so far to implement the multicarrier modulation concept. The most widely used is called OFDM (Orthogonal Frequency Division Multiplexing) and relies on FFT (Fast Fourier Transform) to spread sub-carriers across the transmission channel bandwidth. In this technique, described in more details in the book by M. Bellanger titled <<Digital processing of signals>>, third edition, published in 2000 by Wiley, pages 414 to 418, the group of data fed into the input of the IFFT block (adapted to provide at its output the inverse Fourier transform of the signal input) and called <<symbols>>, give at the output of this iFFT block a block of samples of the signal to be transmitted.

Blocks of signal samples associated with successive symbols have to be transmitted with a guard time in order to avoid interference between the blocks present in the channel. A cyclic prefix is inserted in the transmitted sequence for that purpose.

An alternative approach is called FBMC (Filter Bank based MultiCarrier) modulation or OFDM/OQAM (Offset Quadrature Amplitude Modulation), as it combines the use of filter banks to divide the transmission channel into sub-channels and a modulation in which the real part and the imaginary part of a complex symbol are transmitted with a time shift of half a symbol on order to maximize throughput. A detailed description of this approach is given in the paper by B Hirosaki, "An Orthogonally Multiplexed QAM System Using the Discrete Fourier Transform", IEEE Trans. on Communications, Vol. COM-29, July 1981.

Although FBMC has not been deployed on a large scale so far, it is appealing for future radio and wireless systems because of two key advantages. First, since it does not require a guard time, it offers an increased maximum throughput and, second, due to the filtering operation, it provides high spectral resolution and allows using independent sub-channels, two crucial features for the new concepts of dynamic spectrum access and cognitive radio.

However, an obstacle for the application of FBMC to radio systems comes from the impulse response of the filters, which introduces a transition phase and extends the duration of the initialization process. The effect is particularly important in systems using burst transmission with a preamble at the beginning of the burst to align receiver and transmitter and measure channel characteristics in order to optimize receiver performance. The initialization issue and the techniques employed by OFDM systems have been reported in the literature and a review is presented in the paper by M. Morelli et al., <<Synchronization techniques for Orthogonal Frequency Division Multiple Access (OFDMA): a Tutorial Review>>, Proceedings of the IEEE, Vol. 95, No. 7, July 2007. Regarding FBMC modulation, the same techniques can be used, as reported in the paper by T. Fusco et al., <<Data Aided Time Domain Synchronization for Filter Bank Multicarrier Systems>>, Proceedings of EUSIPCO'08 conference, Lausanne, August 2008. But the approach has two major weaknesses. First, a specific device is needed, which operates separately from the filter bank and is to be added in the receiver, therefore increasing the complexity of the device. Second, once the parameters have been measured, the filter bank is turned on and the transitory phase due to the filter impulse response is not used, which is suboptimal. In addition, some of the measurement results have to be interpreted to fit the filter bank requirements. Clearly, the initialization issue of systems using FBMC modulation has not been adequately solved.

SUMMARY OF THE INVENTION

It is an object of the present invention to achieve a highly robust and efficient burst transmission system, using the filter bank based multicarrier modulation concept.

This object as well as others are achieved through the present invention relating to a filter bank based multicarrier signal transmission system comprising at least an emitter comprising an iFFT block adapted to provide at its output the inverse Fourier transform of its input signal, a set of first memories, and a first weighted summation device, said transmission system comprising switches having each an input connected to the output of the iFFT block, an input connected to one of said first memories and an output connected to another of said first memories.

The synthesis filter bank (SFB) of the emitter is thus equipped with a set of switches for the preloading of the memories. Thanks to these switches, the output of the iFFT block corresponding to the first symbol to be transmitted is loaded into the memories of the filter bank.

This way, there is no transition phase due to the filter impulse response and the first symbol is transmitted without delay. Moreover, the operation is equivalent to applying a constant signal at the input of the sub-channels and it results in the generation of a set of sinewaves whose frequencies are the center frequencies of the sub-channels used.

According to a first advantageous and non limitative characteristic of the invention, the transmission system comprises at least a receiver comprising a FFT block adapted to provide at its output the Fourier transform of its input signal, a set of second memories, a second weighted summation device, and other switches, each having an input connected to the input of said receiver, an input connected to one of said second memories and an output connected to another of said second memories.

The analysis filter bank in the receiver is thus equipped with a set of switches for the preloading of the memories. Thanks to these switches, the first set of received samples corresponding to the first transmitted symbol is loaded into the filter bank memories. This way, the first transmitted symbol is repeated at the output of the filter bank a number of times equal to the number of memories in the filter bank. If the first transmitted symbol is a preamble symbol known of the receiver, the channel characteristics are measured by processing the received sets of samples containing the preamble symbol.

According to other advantageous and non limitative characteristics of the transmission system of the invention,
- it comprises modulation means of the signal using the OQAM method, and the emitter and receiver each comprise two polyphase networks equipped with preloading means of the corresponding first memories and second memories;
- it comprises a plurality of said emitter and a single receiver.

The memory preloading technique can indeed be extended to transmission systems having several emitters and a single receiver. Simultaneous measurements of the channels connecting the emitters and the receiver is achieved, provided that the preamble symbol is adequately designed.

The invention also relates to a transmission method of a signal using the transmission system wherein the inverse Fourier transform, obtained at the output of said iFFT block, of a first symbol of said signal to be transmitted by the emitter, is loaded into said first memories at the beginning of the transmission.

According to other advantageous and non limitative characteristics of the method according to the invention, the first set of signal samples received by the receiver corresponding to a symbol transmitted by the emitter is loaded into said second memories;

the first symbol transmitted by the emitter is a preamble symbol known by the receiver.

Then, advantageously, the first sets of samples provided by the receiver and corresponding to preamble symbols are processed to provide estimations of the characteristics of a channel connecting said emitter and said receiver.

In the case of a system comprising a plurality of said emitters and a single receiver, the first symbol transmitted by the plurality of emitters is a preamble symbol known of the receiver and defined to enable the estimation of the characteristics of channels connecting said emitters to the receiver.

BRIEF DESCRIPTION OF THE DRAWINGS

The following description, in light of the appended drawings, given as a nonlimiting example, will give a clear understanding of how the invention can be implemented.

In the appended drawings.

DETAILED DESCRIPTION OF AN EXEMPLARY EMBODIMENT

Figure 1:
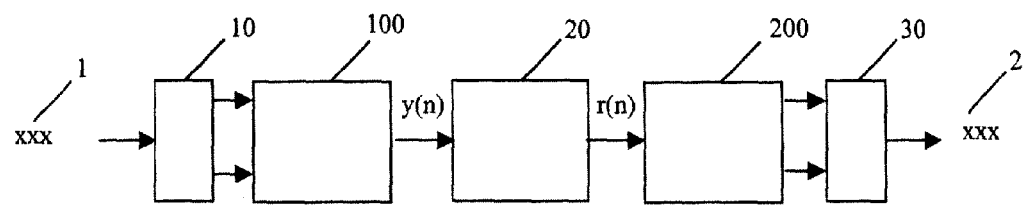
FIG. 1 is a simplified block diagram of a filter bank based multicarrier transmission system according to the invention.

In the block diagram of FIG. 1 showing a filter bank based multicarrier transmission system, the input data stream is fed to a serial-to-parallel converter 10, called S/P converter 10, coupled to an emitter 100 comprising a synthesis filter bank, whose task is to build the multicarrier signal emitted y(n) from the data symbols 3 provided by the S/P converter 10. This emitted multicarrier signal y(n) is thus built by a succession in time of these symbols 3. The output of the synthesis filter bank is connected to the transmission channel, which delivers the received signal r(n) to the receiver 200 comprising an analysis filter bank. A parallel-to-serial converter, called P/S converter 30, provides the output data stream 2.

Figure 2:
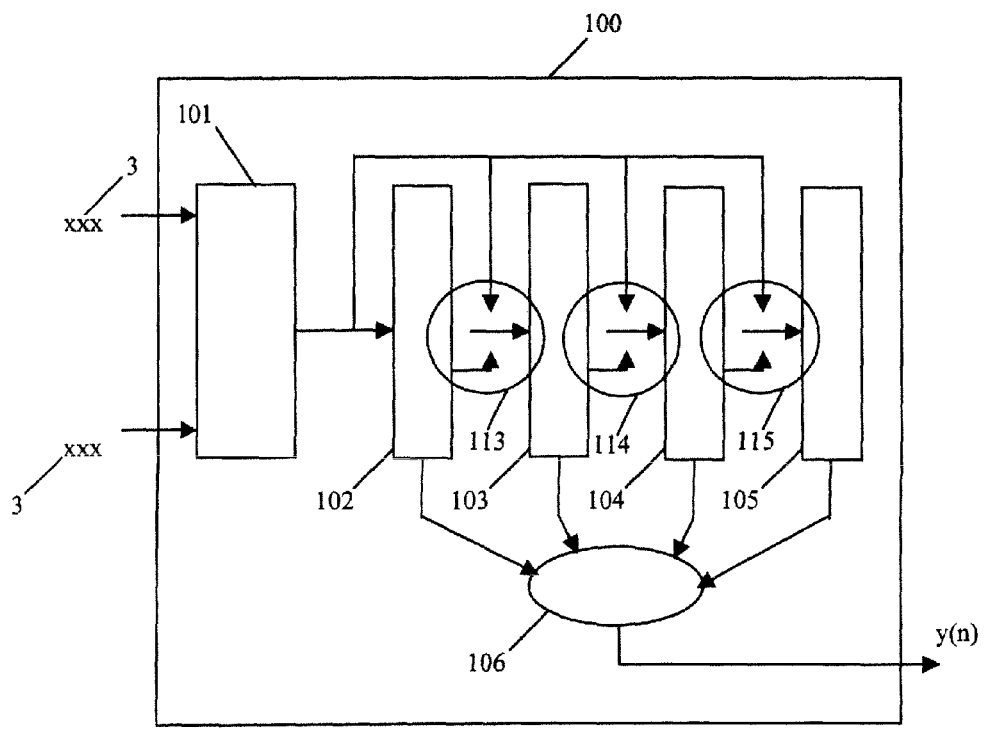
FIG. 2 is a block diagram of the emitter of the transmission system of FIG. 1, comprising a synthesis filter bank equipped with memory preloading means.
Figure 4:
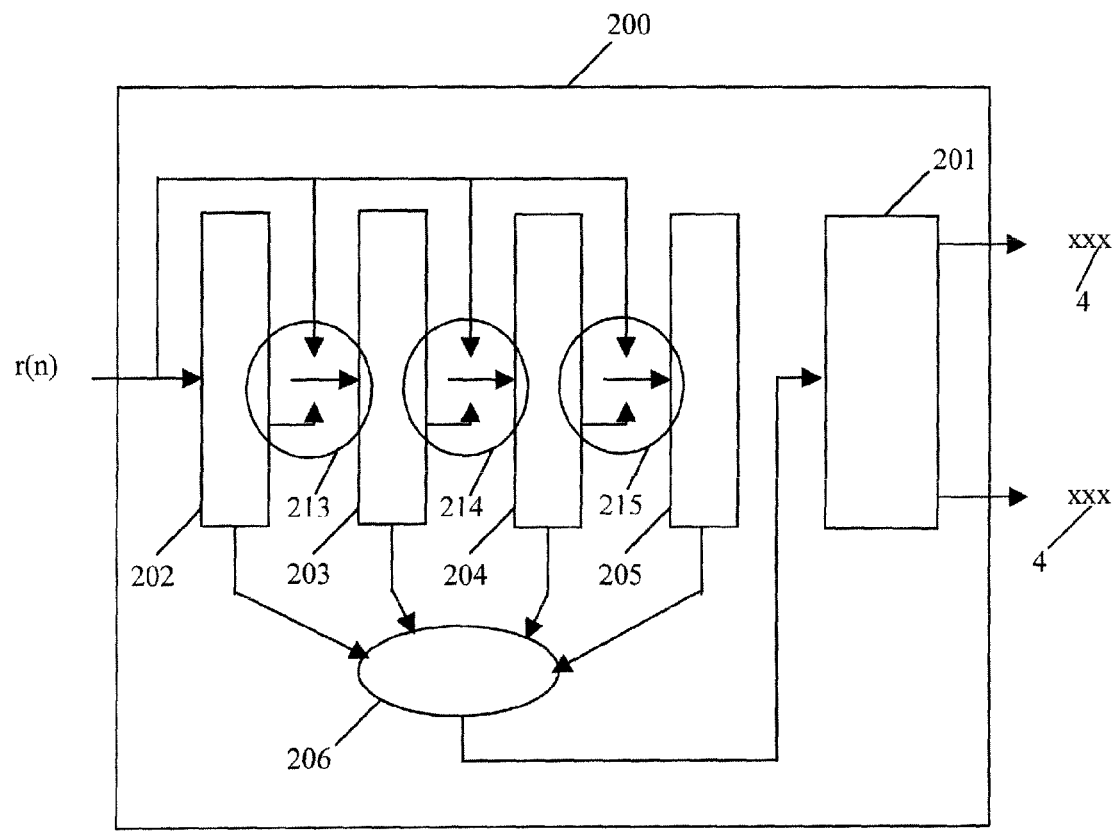
FIG. 4 is a block diagram of the receiver of the transmission system shown in FIG. 1, comprising an analysis filter bank equipped with memory preloading means.

The present invention relates to the transmission system comprising the multicarrier emitter 100 and the receiver 200 shown in greater details in FIGS. 2 and 4 respectively.

Turning to FIG. 2, the input data symbols 3 are first processed in the emitter 100 by an iFFT block 101 adapted to provide at its output the inverse Fourier transform of its intput signal.

According to the filter bank theory, the synthesis filter bank of the emitter 100 consists of the iFFT block 101 connected to a polyphase network. A detailed description of such a filter bank comprising a polyphase network is given page 304 to 306 of the book by M. Bellanger quoted in the introduction. A description of the operations achieved by such a filter bank is given in chapter 11 of the book by M. Bellanger, in particular page 309 to 316.

The polyphase network has K memories, K being the ratio of a prototype synthesis bank filter length L to the size M of the FFT.

For each filter bank, whether synthesis filter bank used for emission or analysis filter bank used for reception, the prototype bank filter is the low-pass filter from which the filters of the bank are deduced through frequency translation. The size of the FFT corresponds to the number of inputs of said iFFT block 101 or to the number of outputs of the corresponding FFT block 201 (see FIG. 4).

In the embodiment shown in FIG. 2, K=L/M=4 and the polyphase network of the emitter 100 comprises four memories 102, 103, 104 105 that feed a weighted summation device 106 which carries out a weighted summation of the signal samples memorized into the four memories and thus provide the multicarrier signal output y(n).

The weighting coefficients used in the summation achieved by the weighted summation device 106 are the elements of the impulse response of the prototype filter from which the filters of the bank are derived.

Together, the memories and the weighted summation device implement the polyphase network (PPN-PolyPhase Network) of the filter bank theory.

Remarkably, said emitter 100 comprises switches 113, 114, 115 each having an input connected to the output of the iFFT block 101, an input connected to one of said memories 102, 103, 104 of the emitter polyphase network and an output connected to another of these memories 103, 104, 105.

More precisely, the emitter 100 comprises a number K−1 of switches 113, 114, 115 equal to the number of memories minus one.

A first memory 102 has its input only connected to the output of the iFFT block. The K−1 other memories 103, 104, 105 have their input connected alternatively to the output of the iFFT block 101 or to the output of another memory 102, 103, 104, depending on the position of the K−1 switches 113, 114, 115.

These switches are shown in FIG. 2 in an intermediate position between an up position where each memory is connected to the output of the iFFT block and therefore loads the set of samples emitted at this output, and a down position where the first memory 102 is connected to the iFFT block and the K−1 other memories 103, 104, 105, named second memory 103, third memory 104 and fourth memory 105 are connected in series with the first memory 102.

At the beginning of a transmission burst, the switches 113, 114, 115 at the inputs of the second, third and fourth memories 103, 104, 105, respectively, are in the up position and the first set of M samples delivered by the iFFT block 101 is loaded into the 4 memories. Then, the switches 113, 114, 115 are brought to their down position and the sets of M samples that are emitted successively at the output of the iFFT block 101 are fed to the first memory 102, whereas the output of the successive second, third and fourth memories 103, 104, 105 is connected respectively to the first, second and third memory 102, 103, 104 preceding them.

The rate of these operations is the rate of calculation achieved by the iFFT block. This rate is imposed by a synchronizing device (not shown).

Figure 3:
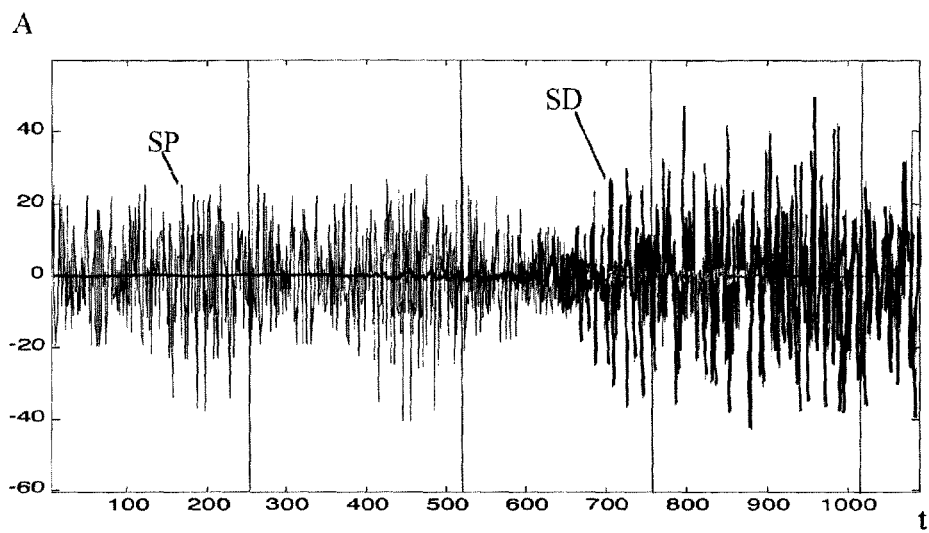
FIG. 3 shows the first sets of samples transmitted by the emitter of FIG. 2.

In terms of signal processing, the memory preloading operation described above represents the application of a constant signal, that is to say a zero frequency signal, to the sub-channels, leading to the generation of a periodic signal provided at the filter bank output without any transition phase due to the filter impulse response. In general, the first symbol is a symbol called preamble symbol P, known by the receiver, and used to align the emitter and the receiver and to measure the characteristics of the channel connecting the emitter 100 to the receiver 200. An illustration of the process described is given in FIG. 3. At the beginning of the transmission, a preamble symbol P is applied to the iFFT block 101, followed by data symbols. FIG. 3 shows the superposition of the preamble signal SP and the data signal SD, the signals corresponding to different symbols being separated by vertical lines. In FIG. 3, the vertical axis represents the amplitude A of the signal and the horizontal axis represents the time t, with the sampling period as a unit. There is no transition phase for the preamble symbol. During the transition phase of the data signal, the preamble signal is provided and can be processed.

As shown in FIG. 4, the receiver 200 comprises here a FFT block 201 adapted to provide at its output a Fourier transform of its input signal and a polyphase network comprising a number of other memories 202, 203, 204, 205, here equal to the number K of memories in the polyphase network of the emitter 100, this number thus being 4, which feed another summation device 206 achieving a weighted summation of the signal memorized in the other memories.

Advantageously, this receiver 200 comprises other switches 213, 214, 215 each having an input connected to the receiver 200 input, an input connected to one of said other memories 202, 203, 204 and an output connected to another of said other memories 203, 204, 205.

More precisely, the receiver 200 comprises a number K−1 of other switches 213, 214, 215 equal to the number of other memories it comprises minus one.

A first other memory 202 has its input connected only to the output of the transmission channel 30 and receives the received signal r(n). The K−1 other memories 203, 204, 205 of the receiver 200 have their input connected alternatively to the output of this transmission channel 30 or to the output of one other memory 202, 203, 204 of the receiver 200, depending on the position of the K−1 switches 213, 214, 215.

These other switches 213, 214, 215 are shown on FIG. 4 in an intermediate position between an up position where each memory is connected to the output of the transmission channel 30, and therefore loads a set of M samples of the received signal r(n), and a down position where the first other memory 202 is connected to the transmission channel 30 and the K−1 other memories 203, 204, 205, called second other memory 203, third other memory 204 and fourth other memory 205, are connected in series with the first other memory 202.

At the beginning of a burst reception, the other switches 213, 214, 215 are in the up position, and the first set of M samples of the received signal r(n) is loaded into each of the other memories 202, 203, 204, 205. Then, these other switches 213, 214, 215 are brought to their down position, so that the second, third and fourth other memories 203, 204, 205 are connected in series one to the other and therefore load the signal memorized in the preceding memory, at each step of the synchronized rate. The other memories 202, 203, 204, 205, along with the weighted summation device 206, implement the polyphase network of the receiver.

The weighting coefficients used in the summation achieved by the other weighted summation device 206 are the elements of the impulse response of the prototype filter from which the analysis filter bank is derived.

The FFT block 201 delivers sets of samples 4 corresponding to the data symbols 3 fed to the emitter.

Alternatively, the transmission system according to the invention can comprise a plurality of emitters and receivers as described before.

As a variant, in order to achieve maximum throughput, FBMC technique is combined with OQAM modulation, described in detailed in the paper by B. Hirosaki mentioned above or in the paper by P. Siohan et al., <<Analysis and Design of OFDM/OQAM Systems Based on Filter Bank Theory>>, IEEE Trans. on Signal Processing, Vol. 50, No. 5, 2002.

Figure 5:
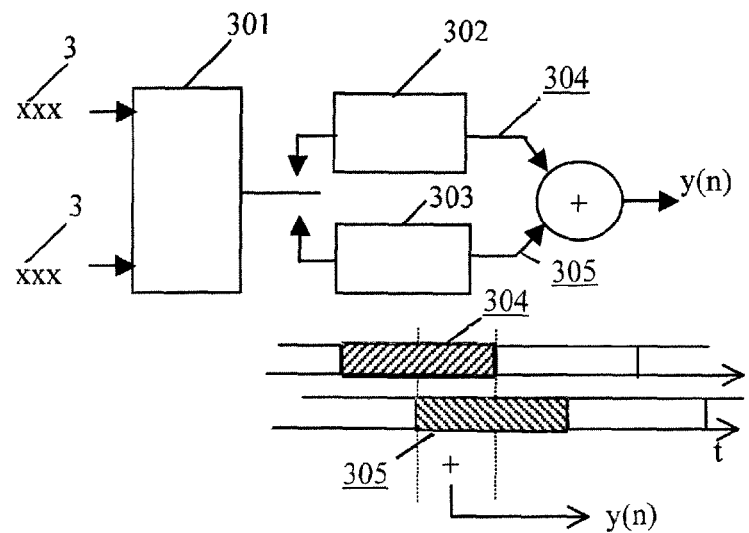
FIG. 5 is a block diagram of a variant of the emitter of the transmission system according to the invention, corresponding to OQAM modulation and showing the temporal interweaving of the transmitted signals; and, FIG. 6 shows the signals provided at the output of the analysis filter bank of the receiver after parallel-to-serial conversion.

As shown in the upper part of FIG. 5, the transmission system emitter according to the invention comprises then two polyphase networks 302, 303 working in parallel, with a time shift equal to half the duration of a symbol. Their output signals 304, 305 are added to obtain the samples of the emitted multicarrier signal y(n) fed to the transmission channel. These output signals 304, 305 are shown diagrammatically in the lower part of FIG. 5. A single iFFT block 301, working with a double rate, can be used as shown on the upper part of FIG. 5.

The receiver can also similarly comprise two polyphase networks.

The preloading scheme can be applied to either of the two polyphase networks or to both. Dual functions are performed in the receiver.

Figure 6:
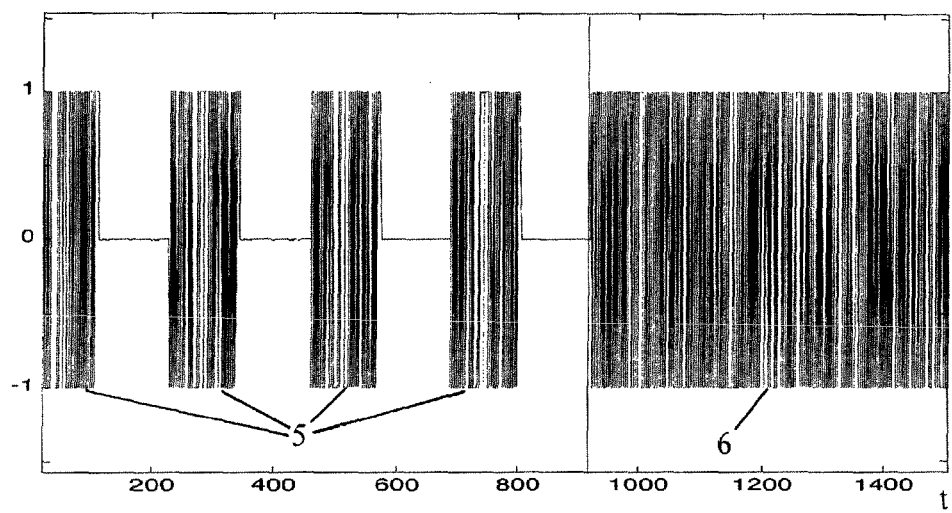

The signal obtained at the beginning of the transmission, at the output of the analysis filter bank and after parallel-to-series conversion is shown in FIG. 6.

In this example, emitted data are binary (+/−1) and the signal amplitude is equal to one. The horizontal axis represents time t with the sampling period as a unit. FIG. 6 shows the reception of preamble symbols 5 and data 6. Only one polyphase network is used for the preamble with preloading of the memories, OQAM modulation being applied only to data. The number of preamble symbols in the sequence obtained equals the number K=4 of memories in the polyphase network.

Samples corresponding to the received preamble symbols, at the output of the analysis filter bank, are processed in order to

- estimate the channel frequency response. If the preamble symbol consists of binary elements, the mere multiplication of the output signal samples of the analysis filter bank by these elements yields the channel responses at the center frequencies of the sub-channels used. Processing the 4 available preamble symbols brings an improvement in signal-to-noise ratio of up to 3 dB, which is advantageous in the presence of high level noise in the channel;
- estimate the time shift, if necessary: once the channel frequency response has been estimated, computing the discrete-time inverse Fourier transform yields the channel impulse response, from which the time shift is derived, for example by thresholding;
- estimate the noise power after demodulation.

The detailed operations corresponding to these treatment is given in particular in the paper by M. Morelli et al. quoted above.

The memory preloading technique applies to the so-called MIMO systems, that is to say, to transmission systems comprising several emitters and several receivers. A detailed description of MIMO systems is given in the paper by A. J. Paulraj et al. <<An Overview of MIMO Communications>>, Proceedings of the IEEE, Vol. 92, No. 2, February 2004.

In this context, it is necessary to estimate the frequency responses of the channels connecting each of the emitters to every receiver. With the transmission method using memory preloading, the channels can be estimated simultaneously and without delay, provided that the preamble symbol is adequately designed.

This method is here described in the case of two emitters. The preamble symbol of the first emitter uses the sub-channels with even indices and the preamble symbol of the second emitter uses the sub-channels with odd indices. At the input of the receiver, the signals of the two channels add up. However, as the two signals use different sub-channels and as the preloading technique is equivalent to feeding a constant signal to the sub-channel inputs, there is no interference, signal separation is achieved in the receiver and the two transmission channels are estimated without delay and simultaneously. The estimation is achieved for the center frequencies of every second sub-channel in each case. Estimation at the center frequencies of all the sub-channels can be obtained through interpolation. This approach can be readily extended to more than two emitters, by selecting adequately the sub-channels used by the preamble symbols fed to each emitter.

Various modifications to the present invention will become apparent to those skilled in the art from the foregoing description and accompanying drawings.

The invention claimed is:

1. A filter bank based multicarrier signal transmission system, comprising:
    at least an emitter that comprises an iFFT block adapted to provide at an output thereof the inverse Fourier transform of an input signal of the emitter, a set of first memories, and a first weighted summation device;
    a plurality of switches each having an input connected to the output of said iFFT block, an input connected to one of said first memories and an output connected to another of said first memories;
    at least one receiver that comprises a FFT block adapted to provide at an output thereof the Fourier transform of the input signal of the receiver, a set of second memories, a second weighted summation device, and other switches each having an input connected to the input of said receiver, an input connected to one of said second memories and an output connected to another of said second memories; and
    modulation means of the signal using the Offset Quadrature Amplitude Modulation (OQAM) method,
    wherein the emitter and receiver each comprise two polyphase networks equipped with preloading means of the corresponding first memories and second memories.

2. A transmission method of a signal using the transmission system according to claim 1, wherein the inverse Fourier transform of a first symbol of said signal to be transmitted by the emitter, provided at the output of said iFFT block, is loaded into said first memories at the beginning of the transmission.

3. The transmission method according to claim 2, wherein the first set of signal samples received by the receiver, corresponding to a symbol transmitted by the emitter, is loaded into said second memories.

4. The transmission method according to claim 2, wherein the first symbol transmitted by the emitter is a preamble symbol known by the receiver.

5. The transmission method according to claim 4, wherein the first sets of samples provided by the receiver, and corresponding to preamble symbols, are processed to provide estimations of the characteristics of a channel connecting said emitter and said receiver.

6. The transmission system according to claim 1, comprising a plurality of said at least one emitter and a single receiver.

7. Transmission method of a signal using the transmission system according to claim 6, wherein the first symbol transmitted by the plurality of emitters is a preamble symbol known of the receiver and defined to enable the estimation of the characteristics of channels connecting said emitters to the receiver.

* * * * *